(12) United States Patent
Hoechst et al.

(10) Patent No.: US 6,866,112 B2
(45) Date of Patent: Mar. 15, 2005

(54) MOTORCYCLE HAVING STATIONARY BELT TENSIONER

(75) Inventors: Dane J. Hoechst, Elkhorn, WI (US); Erik F. Buell, Mukwonago, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/901,479

(22) Filed: Jul. 9, 2001

(65) Prior Publication Data

US 2002/0043416 A1 Apr. 18, 2002

(51) Int. Cl.$^7$ ................................................ B62D 61/02
(52) U.S. Cl. ...................................... 180/231; 474/101
(58) Field of Search ........................ 180/231; 474/101, 474/111

(56) References Cited

U.S. PATENT DOCUMENTS

| | | | | |
|---|---|---|---|---|
| 3,819,002 A | * | 6/1974 | Heathwaite et al. | 180/227 |
| 3,838,606 A | * | 10/1974 | Scalise | 474/111 |
| 4,034,821 A | * | 7/1977 | Stoddard et al. | 180/227 |
| 4,280,582 A | * | 7/1981 | Kouyama et al. | 180/219 |
| 4,299,582 A | * | 11/1981 | Leitner | 180/227 |
| 4,433,747 A | * | 2/1984 | Offenstadt | 180/227 |
| 4,650,026 A | * | 3/1987 | Shiraishi | 180/227 |
| 4,705,494 A | * | 11/1987 | Gibson | 474/109 |
| 4,735,277 A | * | 4/1988 | Prince | 180/227 |
| 4,828,069 A | * | 5/1989 | Hatsuyama | 180/219 |
| 5,857,538 A | * | 1/1999 | Chambers | 180/219 |
| 5,908,078 A | * | 6/1999 | Belil Creixell | 180/219 |
| 6,024,185 A | * | 2/2000 | Okada et al. | 180/227 |
| 6,499,553 B2 | * | 12/2002 | Suzuki | 180/251 |

FOREIGN PATENT DOCUMENTS

| | | | | |
|---|---|---|---|---|
| FR | 1020216 | * | 2/1953 | 180/231 |
| FR | 2370624 A | * | 7/1978 | B62K/11/04 |
| FR | 2520321 A | * | 7/1983 | B62K/25/04 |
| FR | 1114767 A2 | * | 7/2001 | B62K/11/04 |
| GB | 2049578 A | * | 12/1980 | B62K/25/00 |
| JP | 401156118 A | * | 6/1989 | B60G/7/00 |
| JP | 08216967 A | * | 8/1996 | B62M/9/12 |
| SU | 0811015 | * | 3/1981 | 180/231 |

* cited by examiner

Primary Examiner—Lesley D. Morris
Assistant Examiner—Daniel Yeagley
(74) Attorney, Agent, or Firm—Michael Best & Friedrich LLP

(57) ABSTRACT

A motorcycle includes a frame, and an engine and transmission mounted to the frame. A swingarm is pivotably mounted to the frame, and a rear wheel is rotatably mounted to the swingarm. An output shaft of the transmission is coupled to the rear wheel to cause rotation of the rear wheel under power of the engine. A stationary tensioner is mounted to the frame such that as the rear wheel bounces up and down with respect to the frame, the tensioner maintains substantially constant tension and belt path length in the belt without requiring the tensioner to move in a translational or pivotal sense.

19 Claims, 3 Drawing Sheets

MOTORCYCLE HAVING STATIONARY BELT TENSIONER

BACKGROUND

The present invention relates to a drive belt or belt tensioner for a motorcycle. In some motorcycles, a belt tensioner is employed to maintain tension in the drive belt so that the belt is properly engaged with the belt sprockets on the output shaft and the rear wheel. These known belt tensioners, typically rollers, are biased toward the drive belt with a spring or other biasing member such that, as the rear wheel bounces up and down with respect to the motorcycle frame and transmission output shaft, the belt tensioner moves up and down to remain in contact with the drive belt to prevent the belt from slipping on the sprockets. Other types of tensioners include chain rubs that are fixably mounted to the frame such that a drive chain of a motorcycle slides against the chain rub to thereby remove some of the slack that exists in the drive chain.

SUMMARY

The present invention provides a motorcycle including a frame and an engine/transmission assembly that includes a transmission operatively interconnected with the engine. The transmission includes an output shaft rotating in response to operation of the engine. The motorcycle includes a drive sprocket mounted to the output shaft for rotation therewith, a swingarm pivotably mounted to at least one of the frame and transmission for pivotal movement within a range of motion, and a rear wheel mounted to the swingarm for rotation with respect to the swingarm. The motorcycle also includes a wheel sprocket mounted to the rear wheel for rotation therewith, a flexible drive member coupling the drive sprocket and the wheel sprocket, and a tensioner having an axis that is fixed against both pivotal and translational movement with respect to the axis of the transmission output shaft. The tensioner is positioned to be in substantially constant contact with the drive member and to maintain a substantially constant belt path length as the swingarm pivots fully through its range of motion.

The tensioner may include a bracket fixedly mounted to the transmission, engine, and/or motorcycle frame. The tensioner may also include a roller rotatably mounted on the bracket and in contact with the drive member. The roller rotates with respect to the bracket in response to movement of the drive member.

The swingarm preferably pivots about a pivot axis that is non-collinear with the output shaft axis of rotation. This results in changes in spacing between the drive sprocket and the wheel sprocket as the swingarm pivots. The tensioner is positioned to maintain substantially constant tension in the drive member despite pivoting movement of the swingarm and the resulting change in sprocket spacing.

Other features and advantages of the invention will become apparent to those skilled in the art upon review of the following detailed description, claims, and drawings.

Figure 1:
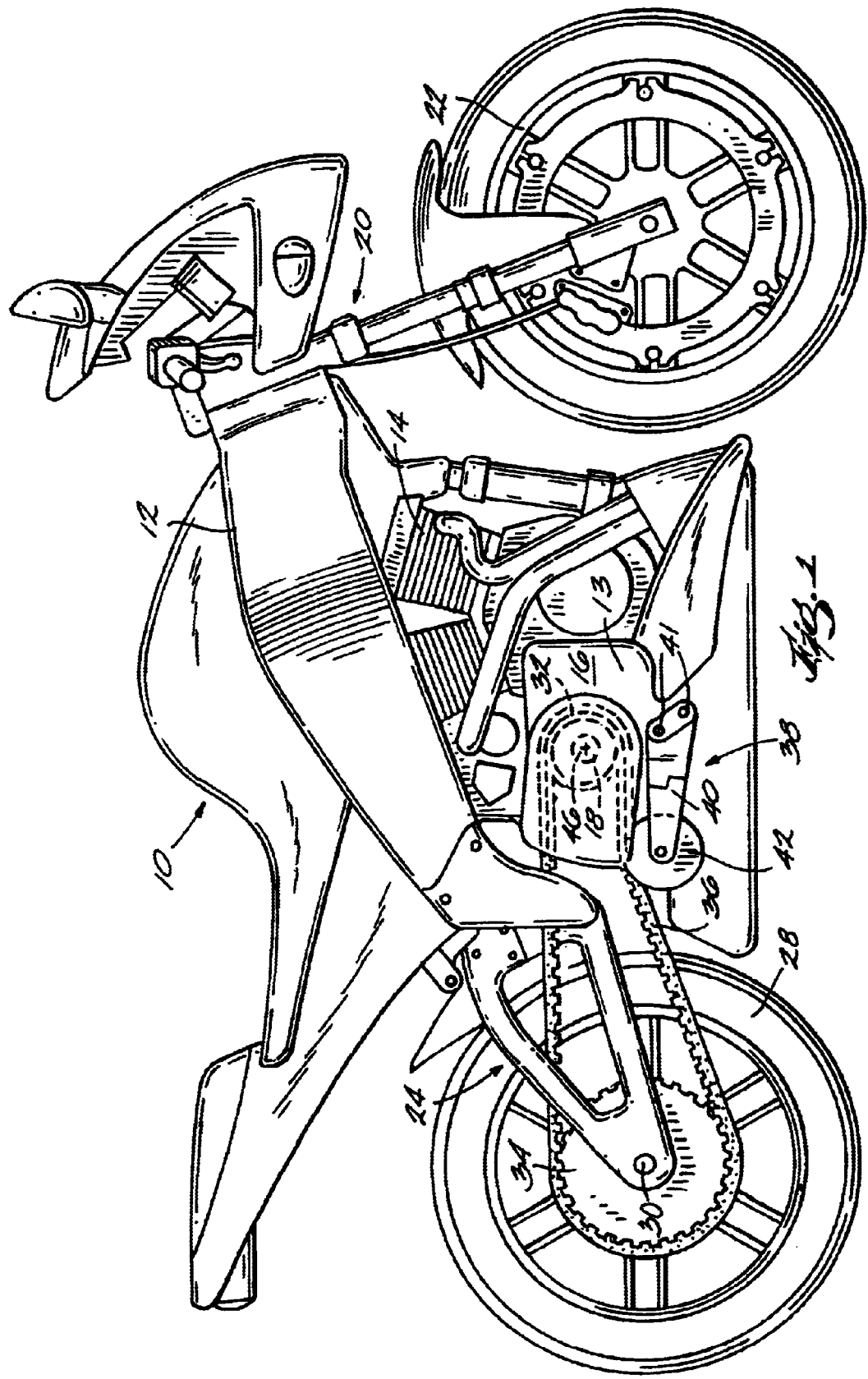
FIG. 1 is a side view of a motorcycle embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 that includes a frame 12 and an engine/transmission assembly 13 connected to the frame 12. The engine/transmission assembly 13 includes an engine 14 and a transmission 16 connected to the engine 14. The engine 14 and the transmission 16 of the engine/transmission assembly 13 could either include a single integral housing or separate housings connected together. The transmission 16 includes an output shaft 18 that is rotated in response to operation of the engine 14. The motorcycle 10 also includes a steering assembly 20 and a front wheel 22 rotatably mounted to the steering assembly 20.

Figure 2:
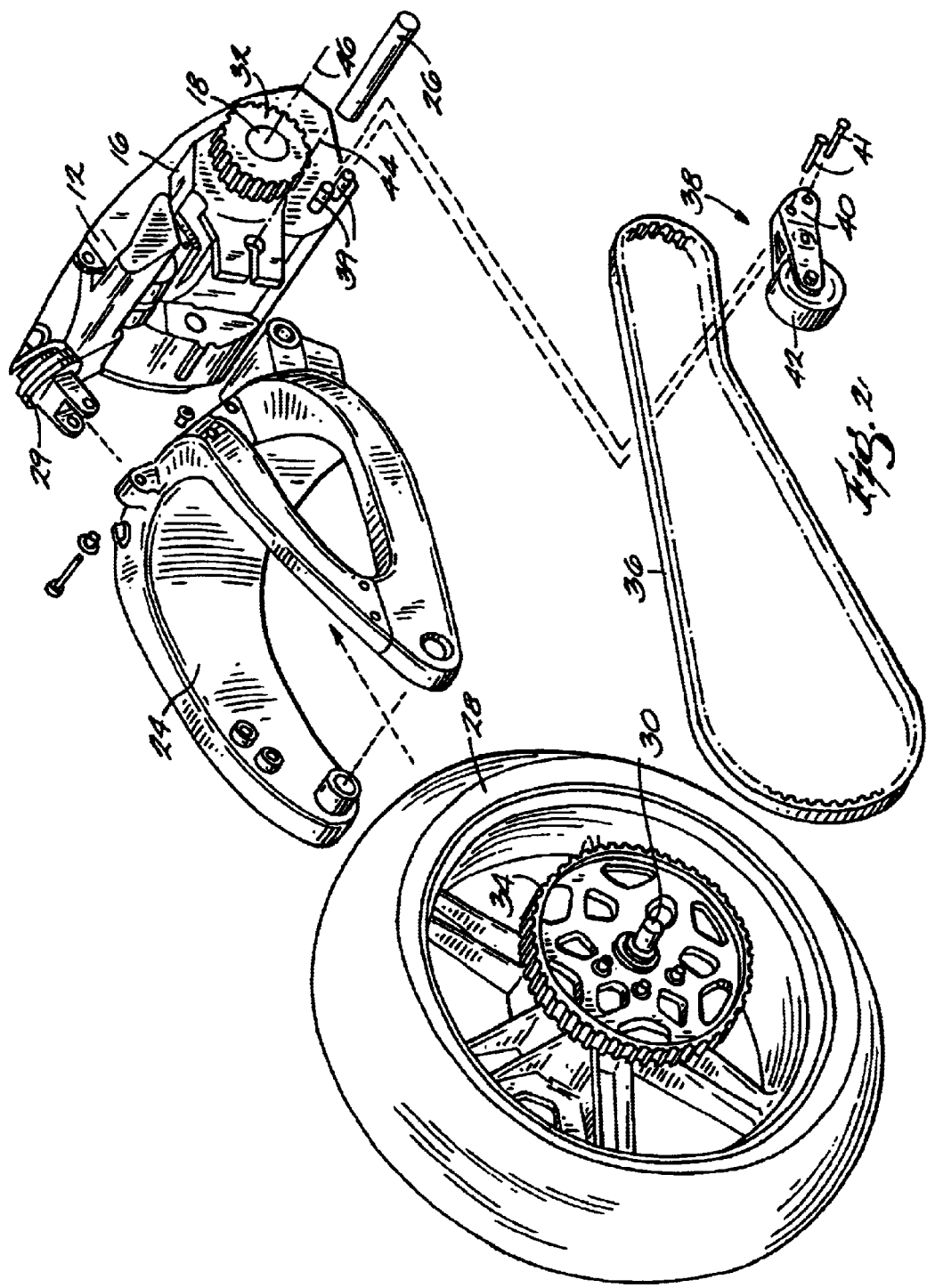
FIG. 2 is an enlarged exploded view of the rear portion of the motorcycle of FIG. 1.

With additional reference to FIG. 2, a swingarm 24 is pivotably mounted to the transmission, or alternatively to the frame 12, with a pivot member 26 (e.g., a bolt or pivot pin) rearwardly of the transmission output shaft 18, and a rear wheel 28 is rotatably mounted to the swingarm 24. A spring or shock absorber 29 is interconnected between the frame 12 and the swingarm 24. The swingarm 24 and shock absorber 29 permit the rear wheel 28 to bounce up and down with respect to the frame 12 and therefore provide a smoother ride on the motorcycle 10. A rear wheel axle 30 is preferably non-adjustable or fixed with respect to the swingarm 24.

The output shall 18 of the transmission 16 includes a drive sprocket 32, and the rear wheel 28 includes a wheel sprocket 34. The sprockets 32, 34 are fixed for rotation with the output shaft 18 and the rear wheel 28, respectively. A drive member such as a chain or the illustrated belt 36 couples the sprockets 32, 34 such that rotation of the output shaft 18 is transmitted to the wheel sprocket 34 and the rear wheel 28. A belt tensioner 38 includes a tensioner bracket 40 fixedly mounted to the transmission 16, or alternatively to the frame 12 or engine 14, and a roller 42 rotatably mounted to the bracket 40. As best illustrated in FIG. 2, the tensioner bracket 40 is mounted to the engine 14 at multiple connection points 39 by fasteners 41.

Figure 4:
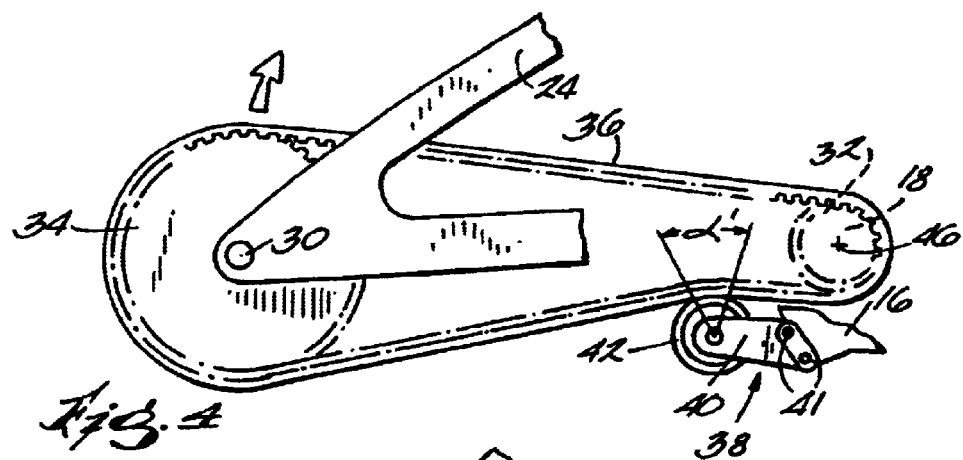
FIG. 4 is an enlarged side view of the rear portion of the motorcycle of FIG. 1 in a rear wheel raised condition.
Figure 5:
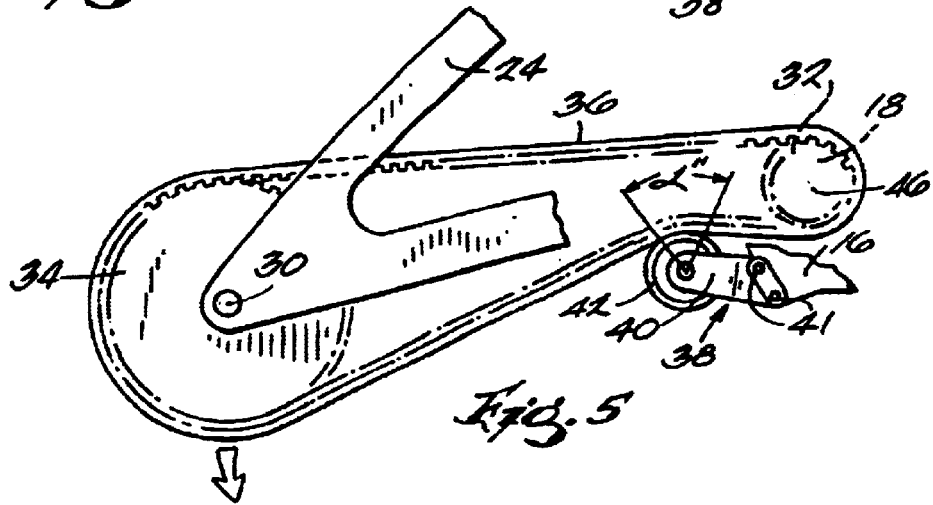
FIG. 5 is an enlarged side view of the rear portion of the motorcycle of FIG. 1 in a rear wheel lowered condition.

As can be seen in FIG. 2, a pivot axis 44 for the swingarm 24 is non-collinear with the axis of rotation 46 of the output shaft 18 of the transmission 16. FIGS. 4 and 5 illustrate the extent of the swingarm 24 range of motion. The distance between the sprockets 32, 34 changes as the rear wheel 28 and swingarm 24 bounce up and down with respect to the transmission output shaft 18. The tensioner 38 is sized and positioned such that the roller 42 remains in substantially constant contact with the drive belt 36 during operation of the motorcycle 10, and such that it maintains substantially constant tension in the drive belt 36 even as the rear wheel 28 and swingarm 24 move with respect to the output shaft 18 through the range of motion of the swingarm 24. The roller 42 rotates in response to movement of the drive belt 36. In addition, a belt path length defined by the drive sprocket 32, the wheel sprocket 34, and the belt tensioner 38 remains substantially constant throughout the range of pivoting motion of the swingarm 24. In the described embodiment, the belt path length remains constant within approximately 0.008" as the swingarm pivots through its full range of 16 degrees.

Figure 3:
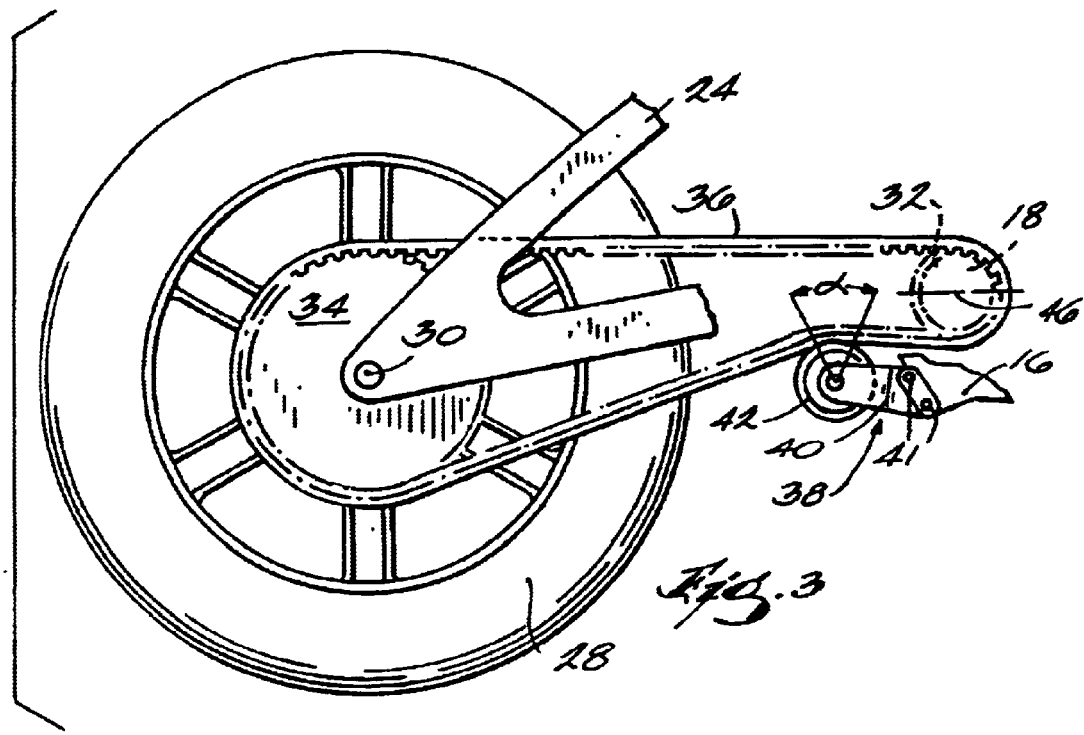
FIG. 3 is an enlarged side view of the rear portion of the motorcycle of FIG. 1 in a level condition.

In the level condition illustrated in FIG. 3, the drive belt 36 is in contact with the roller 42 over a first arc length α. When the rear wheel 28 is moved into the raised condition illustrated in FIG. 4, the rear wheel 28 is moved away from the output shaft 18, but less of the belt 36 contacts the roller 42 along a second smaller arc length α'. When the wheel 28 moves into the lowered condition shown in FIG. 5, the rear wheel 28 is pivoted closer to the output shaft 18, but the resulting slack is taken up by the tensioner 38 as the belt 36 contacts a third larger arc length α" of the roller 42.

Because of the positioning of the tensioner 38, there is no need for a biasing member to hold the tensioner 38 against the drive belt 36. The tensioner 38 is positionally fixed with respect to the frame 12, transmission 16, and engine 14. As used herein, "positionally fixed" means the tensioner 38 does not move in a translational or pivotal sense with respect to the frame 12, transmission 16, and engine 14, but may include a part (i.e., the roller 42) that rotates with respect to the frame 12, transmission 16, and engine 14. Alternatively, the roller 42 could be replaced with a smooth low-friction curved surface over which the drive belt 36 slides during use, and in such a construction the tensioner 38 would not move at all with respect to the frame 12, transmission 16, and engine 14.

One embodiment of the invention includes a 4.136" diameter drive sprocket 32, a 9.925" diameter wheel sprocket 34, and a 3.000" diameter belt roller 42. In this embodiment, the components 32, 34, 42 are spaced relative to each other in order to maintain a substantially constant belt tension and belt path length. Specifically, using polar coordinates and the swingarm pivot axis 44 as the origin (0,0°), the axis of rotation 46 of the drive sprocket 32 is located at (4.000", 355.34°), the axis of rotation of the roller 42 is located at (3.772", 263.42°), and the axis of rotation of the wheel sprocket 34 is located 18.353" from the swingarm pivot axis 44 and is rotatable through a range of motion.

What is claimed is:

1. A motorcycle comprising:
   a frame;
   an engine/transmission assembly mounted to said frame and having an output shaft rotating in response to operation of said engine/transmission assembly;
   a drive sprocket mounted to said output shaft for rotation therewith;
   a swingarm pivotably mounted to at least one of said frame and engine/transmission assembly for pivotal movement within a range of motion;
   a rear wheel mounted to said swingarm for rotation with respect to said swingarm;
   a wheel sprocket mounted to said rear wheel for rotation therewith;
   a flexible drive member coupling said drive sprocket and said wheel sprocket such that said rear wheel is caused to rotate in response to operation of said engine/transmission assembly, wherein said flexible drive member includes an upper extent linearly extending between the upper portions of said drive sprocket and said wheel sprocket, and a lower extent extending between the lower portions of said drive sprocket and said wheel sprocket; and
   a tensioner fixed to at least one of said frame and engine/transmission assembly against both pivotal and translational movement with respect to said output shaft, wherein said tensioner maintains contact with a side of said lower extent and applies a force to said side of said lower extent as said swingarm pivots through said range of motion, and wherein said drive sprocket, said wheel sprocket, and said tensioner are sized and positioned such that a belt path length defined by said drive sprocket, said rear sprocket, and said tensioner remains substantially constant as said swingarm pivots through said range of motion.

2. The motorcycle of claim 1, wherein said tensioner includes a bracket fixedly mounted to at least one of said engine/transmission assembly and frame, said tensioner further including a roller mounted for rotation to said bracket and in contact with said drive member, said roller rotating with respect to said bracket in response to movement of said drive member.

3. The motorcycle of claim 1, further comprising a pivot member interconnecting said swingarm to at least one of said frame and engine/transmission assembly and defining a pivot axis about which said swingarm is pivotable, wherein said output shaft and drive sprocket are rotatable together about an output shaft axis of rotation, and wherein said pivot axis and said axis of rotation are non-collinear.

4. The motorcycle of claim 1, wherein said drive member includes a drive belt.

5. The motorcycle of claim 1, wherein said swingarm is pivotably mounted only to said engine/transmission assembly.

6. The motorcycle of claim 1, wherein said swingarm is pivotably mounted only to said frame.

7. The motorcycle of claim 1, wherein said tensioner is fixed only to said engine/transmission assembly.

8. The motorcycle of claim 1, wherein said tensioner is fixed only to said frame.

9. A method for tensioning a motorcycle flexible drive member, the method comprising:
   providing a motorcycle frame and a swingarm;
   mounting an engine/transmission assembly to the motorcycle frame, the engine/transmission assembly having an output shaft rotating about an axis of rotation in response to operation of the engine/transmission assembly;
   mounting a drive sprocket to the output shaft for rotation therewith;
   mounting a rear wheel to the swingarm for rotation with respect to the swingarm;
   mounting a wheel sprocket to the rear wheel for rotation therewith;
   pivotably interconnecting the swingarm with at least one of the frame and engine/transmission assembly to permit pivotable movement of the swingarm in a range of motion about a pivot axis that is non-collinear with the axis of rotation of the output shaft;
   coupling the drive sprocket and the wheel sprocket with a flexible drive member such that the rear wheel rotates in response to rotation of the output shaft and such that an upper extent of the flexible drive member linearly extends between the upper portions of the drive sprocket and the wheel sprocket;

mounting a tensioner to at least one of the engine/transmission assembly and frame such that the tensioner contacts a side of a lower extent and applies a force to the side of the lower extent;

fixing the tensioner against translational and pivotable movement with respect to the engine/transmission assembly and frame;

pivoting the swingarm through the range of motion while maintaining a substantially constant belt path length defined by the drive sprocket, the wheel sprocket, and the tensioner; and maintaining contact between the side of the lower extent and the tensioner such that the tensioner applies a force to the side of the lower extent as the swingarm pivots through the range of motion.

10. The method of claim 9, wherein the act of mounting a tensioner includes providing a tensioner bracket and a tensioner roller and mounting the tensioner bracket to at least one of the frame and engine/transmission assembly, wherein the act of fixing the tensioner includes fixing the tensioner bracket against translational and pivotable movement with respect to the engine/transmission assembly and frame and rotatably mounting the tensioner roller to the tensioner bracket, and wherein the act of pivoting the swingarm includes contacting the drive member with the tensioner roller to apply tension to the drive member, and further comprising rotating the tensioner roller in response to movement of the drive member.

11. The method of claim 9, wherein the act of pivotably interconnecting the swingarm includes pivotably interconnecting the swingarm only to the engine/transmission assembly.

12. The method of claim 9, wherein the act of pivotably interconnecting the swingarm includes pivotably interconnecting the swingarm only to the frame.

13. The method of claim 9, wherein the act of mounting the tensioner includes mounting the tensioner only to the engine/transmission assembly.

14. The method of claim 9, wherein the act of mounting the tensioner includes mounting the tensioner only to the frame.

15. The method of claim 9, wherein the act of coupling includes coupling the drive sprocket and wheel sprocket with a flexible drive belt.

16. The motorcycle of claim 1, wherein said tensioner is mounted to at least one of the engine/transmission assembly and frame at multiple connection points.

17. The motorcycle of claim 1, wherein said tensioner is mounted to at least one of the engine/transmission assembly and frame with multiple fasteners.

18. The method of claim 9, wherein the act of mounting the tensioner includes mounting the tensioner at multiple connection points.

19. The method of claim 9, wherein the act of mounting the tensioner includes mounting the tensioner with multiple fasteners.

* * * * *